United States Patent
Kling et al.

(10) Patent No.: US 10,472,048 B2
(45) Date of Patent: Nov. 12, 2019

(54) GAS TURBINE ENGINE SPINNER

(71) Applicant: UNITED TECHNOLOGIES CORPORATION, Farmington, CT (US)

(72) Inventors: Colin J. Kling, Middletown, CT (US); Shari L. Bugaj, Haddam, CT (US); James T. Roach, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 439 days.

(21) Appl. No.: 14/930,760

(22) Filed: Nov. 3, 2015

(65) Prior Publication Data

US 2016/0152320 A1    Jun. 2, 2016

Related U.S. Application Data

(60) Provisional application No. 62/086,468, filed on Dec. 2, 2014.

(51) Int. Cl.
| | |
|---|---|
| *B64C 11/14* | (2006.01) |
| *F02C 7/04* | (2006.01) |
| *B29C 70/46* | (2006.01) |
| *B29C 70/14* | (2006.01) |
| *B29K 101/10* | (2006.01) |

(Continued)

(52) U.S. Cl.
CPC .............. *B64C 11/14* (2013.01); *B29C 70/14* (2013.01); *B29C 70/46* (2013.01); *F02C 7/04* (2013.01); *B29K 2101/10* (2013.01); *B29K 2105/128* (2013.01); *B29K 2307/04* (2013.01); *B29L 2031/7504* (2013.01); *B29L 2031/7724* (2013.01); *F05D 2300/603* (2013.01); *Y02T 50/672* (2013.01)

(58) Field of Classification Search
CPC . B64C 11/14; B29C 70/14; F02C 7/04; F05D 2300/603; B64D 33/02; B64D 2033/0286; B64D 2033/0293
See application file for complete search history.

(56) References Cited

U.S. PATENT DOCUMENTS

| | | | | |
|---|---|---|---|---|
| 4,229,397 | A | * 10/1980 | Fukuta | ............... B29C 70/14 264/113 |
| 2008/0022524 | A1 | 1/2008 | Schreiber | |

(Continued)

FOREIGN PATENT DOCUMENTS

| | | | |
|---|---|---|---|
| CA | 2917916 | * | 2/2015 |
| EP | 2458146 A1 | | 5/2012 |

(Continued)

OTHER PUBLICATIONS

European Search Report for Application No. 15197598.4-1607; dated Apr. 14, 2016; 7 pgs.

(Continued)

*Primary Examiner* — Craig Kim
*Assistant Examiner* — Katheryn A Malatek
(74) *Attorney, Agent, or Firm* — Cantor Colburn LLP

(57) ABSTRACT

A spinner for a gas turbine engine is disclosed. The spinner may include a body extending between a first and second end comprised of a cured chopped unidirectional fiber pre-impregnated material. The body may have a generally conical shape and may further be plated with a metal or metal alloy.

19 Claims, 7 Drawing Sheets

(51) Int. Cl.
    *B29K 105/12*    (2006.01)
    *B29K 307/04*    (2006.01)
    *B29L 31/00*     (2006.01)

(56) References Cited

U.S. PATENT DOCUMENTS

| | | | |
|---|---|---|---|
| 2009/0272095 A1 | 11/2009 | Rainous et al. | |
| 2011/0236217 A1* | 9/2011 | Bottome | H01M 2/0235 416/245 R |
| 2013/0255277 A1* | 10/2013 | Macchia | F02C 7/04 60/805 |
| 2014/0186166 A1* | 7/2014 | Kostka | F01D 5/143 415/182.1 |
| 2016/0159488 A1* | 6/2016 | Roach | B29D 22/00 416/245 R |

FOREIGN PATENT DOCUMENTS

| | | | |
|---|---|---|---|
| EP | 3019711 | * | 2/2015 |
| WO | WO2015017095 | * | 2/2015 |

OTHER PUBLICATIONS

European Office Action for Application No. 15197598.4; dated Nov. 8, 2018; 4 pgs.

\* cited by examiner

GAS TURBINE ENGINE SPINNER

CROSS REFERENCE TO RELATED APPLICATIONS

This application is a non-provisional application claiming the 35 U.S.C. § 119(e) benefit of U.S. Provisional Patent Application No. 62/086,468 filed on Dec. 2, 2014.

FIELD OF THE DISCLOSURE

This disclosure generally relates to gas turbine engines and, more specifically, relates to spinners for gas turbine engines.

BACKGROUND OF THE DISCLOSURE

Gas turbine engines are well known internal combustion engines typically used to provide thrust to an aircraft or to provide power for land-based operations. Generally speaking, a gas turbine engine includes a fan, a compressor, a combustor and a turbine arranged in a serial fashion. The fan draws in ambient air as it rotates and moves it to the compressor where the air is compressed or pressurized. The compressed air is then communicated to the combustor where it is mixed with fuel and ignited. The products of the combustion are hot gases which are then directed into the turbine. This causes the airfoils in the turbine to rotate, and as turbine is mounted on the same shaft, or shafts, as the compressor and fan, this causes the compressor and fan to rotate as well. Accordingly, once started, it can be seen that the operation of the engine is self-sustaining in that the combustion of more fuel with air causes more rotation of the turbine and in turn the compressor and the fan. Moreover, the rotation of the fan, which typically has a diameter many times that of the compressor and the turbine, causes the engine to generate thrust.

A spinner is a device that is situated at the forward end of the fan section of a gas turbine engine. Its primary purpose is to form the flowpath for air that is forward of the fan, thereby creating a smoother more continuous flow of air into the blades, the compressor, turbines and bypass flowpath.

It has been customary to make spinners using metals such as aluminum or titanium, or from a two-dimensional para-aramid (Kevlar®) and fiberglass laminate with an integral Y-flange, to attach the spinner to the fan hub forward of the blades. Yet, such design is not without its shortcomings, as the cost of the materials utilized in such a design are expensive, and the weight of the materials utilized to manufacture a spinner with these materials that meet the FAR requirements leads to increased fuel consumption, and therefore increased operational cost. Thus, while certain spinners are known, improvements in the area of material cost and weight is desired.

SUMMARY OF THE DISCLOSURE

In accordance with one aspect of the present disclosure, a spinner is disclosed. The spinner may include a body extending between a first and second end, and the body may be comprised of a cured chopped unidirectional fiber pre-impregnated material. The body may have a generally conical shape.

In a refinement of the spinner, the fiber of the chopped unidirectional fiber pre-impregnated material may be selected from the group consisting of carbon-fiber, graphite-fiber, ceramic, poly(p-phenylene-2,6-benzobisoxazole), mullite, alumina, silicon nitride, silicon carbide, boron, boron nitride, boron carbide, glass, quartz, titanium diboride, yttria stabilized zirconium and combinations thereof.

In another refinement of the spinner, the resin of the chopped unidirectional fiber pre-impregnated material may be a thermoset resin.

In another refinement of the spinner, the thermoset resin may be selected from the group consisting of polyester, thermoset urethane, cyanate ester, vinyl ester, polyimide, bisphenol A epoxy, bisphenol F epoxy, novolac epoxy, glycidyl epoxy, cycloaliphatic epoxy, glycidylamine epoxy, melamine, phenol formaldehyde, polyhexahydrotriazine and combinations thereof.

In another refinement of the spinner, the resin of the chopped unidirectional fiber pre-impregnated material may be a thermoplastic resin.

In another refinement of the spinner, the thermoplastic resin may be selected from the group consisting of low density polyethylene, medium density polyethylene, high density polyethylene, ultra-high molecular weight polyethylene, polyvinyl chloride, polyethylene terephthalate, vinyl, polypropylene, poly(methyl methacrylate), nylon, polybenzimidazole, polystyrene, polytetrafluroethylene, polyetherimide, polyether ketone, polyether ether ketone, acrylonitrile butadiene styrene, styrene acrylonitrile, acrylonitrile styrene acrylate, polyamide, polyaryl ether ketone, polycarbonate, polyoxymethylene, polyphenylene ether, polyphenylene sulfide, polysulfone, polybutylene terephthalate, thermoset urethane and combinations thereof.

In another refinement of the spinner, the body may further include an inner surface and an outer surface, and the outer surface may at least be partially plated with a metal selected from the group consisting of aluminum, titanium, nickel and combinations thereof.

In another refinement of the spinner, the body may further include an inner surface and an outer surface, and the outer surface may at least be partially plated with a metal alloy selected from the group consisting of aluminum alloys, steel, nickel alloys, titanium alloys and combinations thereof.

In accordance with another aspect of the present disclosure, a gas turbine engine is disclosed. The gas turbine engine may comprise a compressor section, a combustor section downstream of the compressor section, and a fan section upstream of the compressor section. The compressor section may further include a spinner. The spinner may include a body extending between a first and second end, and the body may be comprised of a cured chopped unidirectional fiber pre-impregnated material. The body may have a generally conical shape.

In a refinement of the gas turbine engine, the fiber of the chopped unidirectional fiber pre-impregnated material may be selected from the group consisting of carbon-fiber, graphite-fiber, ceramic, poly(p-phenylene-2,6-benzobisoxazole), mullite, alumina, silicon nitride, silicon carbide, boron, boron nitride, boron carbide, glass, quartz, titanium diboride, yttria stabilized zirconium and combinations thereof.

In another refinement of the gas turbine engine, the resin of the chopped unidirectional fiber pre-impregnated material may be a thermoset resin.

In another refinement of the gas turbine engine, the thermoset resin may be selected from the group consisting of polyester, thermoset urethane, cyanate ester, vinyl ester, polyimide, bisphenol A epoxy, bisphenol F epoxy, novolac epoxy, glycidyl epoxy, cycloaliphatic epoxy, glycidylamine epoxy, melamine, phenol formaldehyde, polyhexahydrotriazine and combinations thereof.

In another refinement of the gas turbine engine, the resin of the chopped unidirectional fiber pre-impregnated material may be a thermoplastic resin.

In another refinement of the gas turbine engine, the thermoplastic resin may be selected from the group consisting of low density polyethylene, medium density polyethylene, high density polyethylene, ultra-high molecular weight polyethylene, polyvinyl chloride, polyethylene terephthalate, vinyl, polypropylene, poly(methyl methacrylate), nylon, polybenzimidazole, polystyrene, polytetrafluoroethylene, polyetherimide, polyether ketone, polyether ether ketone, acrylonitrile butadiene styrene, styrene acrylonitrile, acrylonitrile styrene acrylate, polyamide, polyaryl ether ketone, polycarbonate, polyoxymethylene, polyphenylene ether, polyphenylene sulfide, polysulfone, polybutylene terephthalate, thermoset urethane and combinations thereof.

In another refinement of the gas turbine engine, the body may further include an inner surface and an outer surface, and the outer surface may be at least partially plated with a metal selected from the group consisting of aluminum, titanium, nickel and combinations thereof.

In another refinement of the gas turbine engine, the body may further include an inner surface and an outer surface, and the outer surface may be at least partially plated with a metal alloy selected from the group consisting of aluminum alloys, steel, titanium alloys, nickel alloys and combinations thereof.

In accordance with another aspect of the present disclosure, a method of manufacturing a spinner from chopped unidirectional fiber pre-impregnated material is disclosed. The method may comprise the steps of inserting a mat of a chopped unidirectional fiber pre-impregnated material into a first preheated mold cavity having a generally conical shape, followed by closing the mold with a second preheated mold cavity having generally conical shape. Finally, pressure may be applied to force the mat of chopped unidirectional pre-impregnated material into contact with all the mold cavity areas.

In a refinement of the method of manufacturing a spinner from chopped unidirectional fiber pre-impregnated material, the method may further include the step of applying additional heat to the mold to cure a thermoset resin of a chopped unidirectional fiber pre-impregnated material into a spinner having a body extending between a first and a second end, the body comprising a cured chopped unidirectional fiber pre-impregnated material, the body having a generally conical shape.

In a refinement of the method of manufacturing a spinner from chopped unidirectional fiber pre-impregnated material, the method may further include the step of applying additional heat to the mold to raise the temperature of a thermoplastic resin of a impregnated chopped unidirectional fiber pre-impregnated material above its thermal softening transition temperature, followed by removing heat from the mold to lower the temperature of the thermoplastic resin below its thermal softening transition temperature to form a spinner having a body extending between a first and a second end, the body comprising a cured chopped unidirectional fiber pre-impregnated material, the body having a generally conical shape.

In a refinement of the method of manufacturing a spinner from chopped unidirectional fiber pre-impregnated material, the method may further include the step of plating the spinner with a metal or metal alloy.

These and other aspects and features of the present disclosure will be more readily understood when read in conjunction with the accompanying drawings.

DETAILED DESCRIPTION OF THE DISCLOSURE

In the description and claims that follow, the term "nosecone" may be used interchangeably with the term "spinner." As is understood, a nosecone (like a spinner) is a device that is situated at the forward end of the fan section for the purpose of forming the flowpath for impinging air that is forward of the fan, and thereby creating a smoother more continuous flow of air into the blades, compressor, turbines and bypass flowpath. As such, a "nosecone" also has to meet the afore-described FAR requirements. The primary difference between a "nosecone" and a "spinner" is that the nosecone remains stationary, while a spinner rotates.

Figure 1:
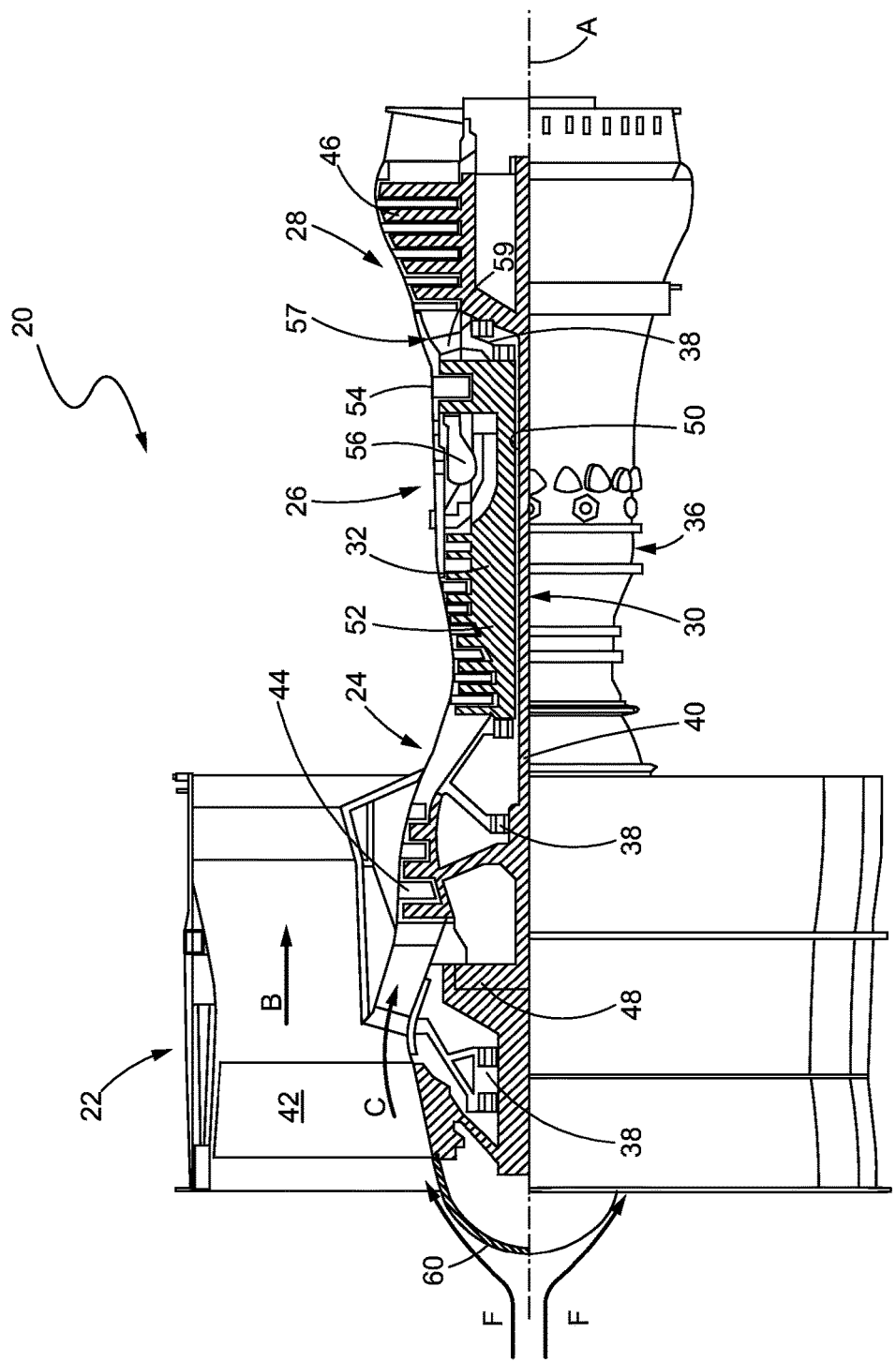
FIG. 1 is a side, partially cross-sectional view of a gas turbine engine constructed in accordance with the present disclosure.

Referring now to the drawings, and with specific reference to FIG. 1, a gas turbine engine is shown and generally referred to be reference numeral 20. The gas turbine engine 20 disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B, while the compressor section 24 drives air along a core flowpath C for compression and communication into the combustor section 26. As will be described in further detail herein, in the combustor section 26, the compressor air is mixed with fuel and ignited, with the resulting combustion gases then expanding in turbine section 28. Although depicted as a turbofan gas turbine engine in the disclosed non-limiting embodiment, it should be understood that the concepts described herein are not limited to use with turbofans as the teachings may be applied to other types of turbine engines including, but not limited to, three-spool architectures as well.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects the fan blade assembly 42, a low pressure (or first) compressor section 44 and a low pressure (or first) turbine section 46. The inner shaft 40 is connected to the fan blade assembly 42 through a geared architecture 48 to drive the fan blade assembly 42 at a lower speed than the low speed spool 30. The high speed spool 32 includes an outer shaft 50 that interconnects a high pressure (or second) compressor section 52 and high pressure (or second) turbine section 54. The outer shaft 50 is typically concentric with and radially outward from the inner shaft 40. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed first by the low pressure compressor 44, and then by the high pressure compressor 52, before being mixed and burned with fuel in the combustor 56, and lastly expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 in one example is a high-bypass geared aircraft engine. In a high-bypass engine a greater volume of air moves along a bypass flowpath B than through core airflow C. The ratio of the mass of air moving through bypass flowpath B to core airflow C is known as the bypass ratio. In one example, the gas turbine engine 20 bypass ratio may be greater than about six (6), while in another example the bypass ratio may be greater than ten (10), the geared architecture 48 may be an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

Figure 2:
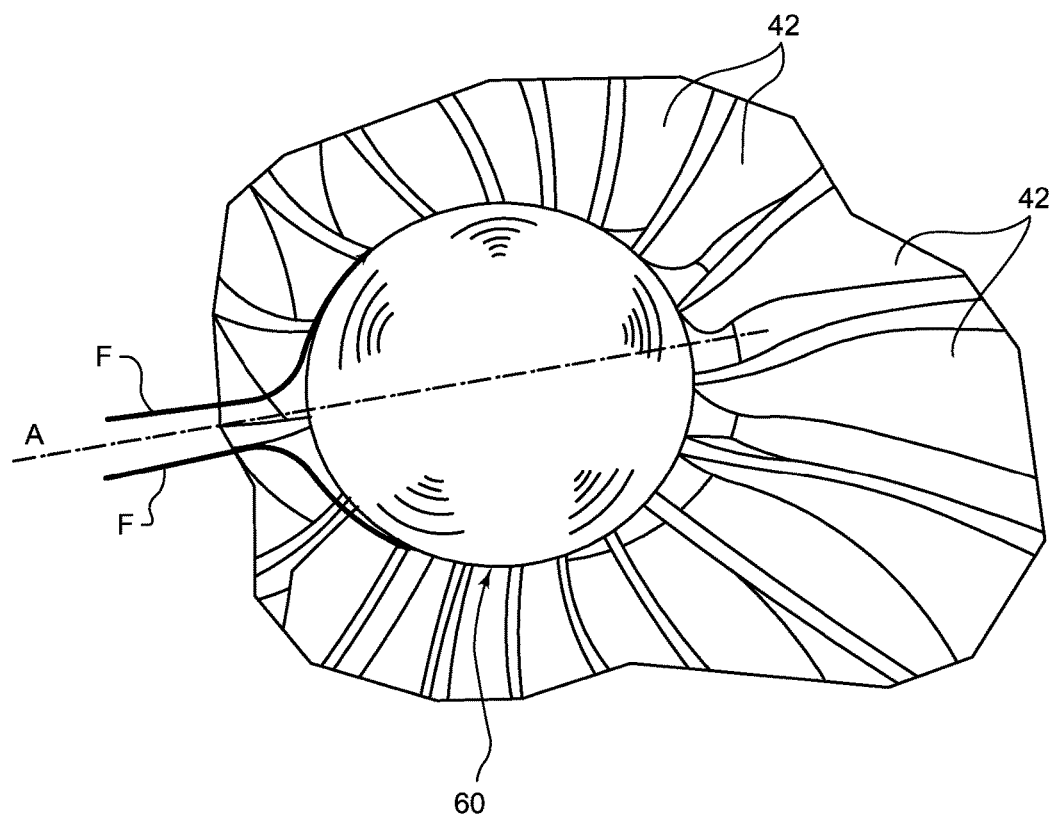
FIG. 2 is a perspective view of a portion of the fan section depicting the relative location of a fan blade assembly and spinner manufactured in accordance with the present disclosure.

Now turning to FIGS. 1-2, the fan section 22 may further include a spinner 60. The spinner 60 may be situated at the forward end of the fan section 22 of the gas turbine engine 20. As is shown, the spinner may form an airpath flowpath F for impinging air that is forward of the fan blade assembly 42, and create a smoother and more continuous flow of air into the fan blade assembly 42, the compressor section 24, the turbines 28 and bypass flowpath B.

Figure 3:
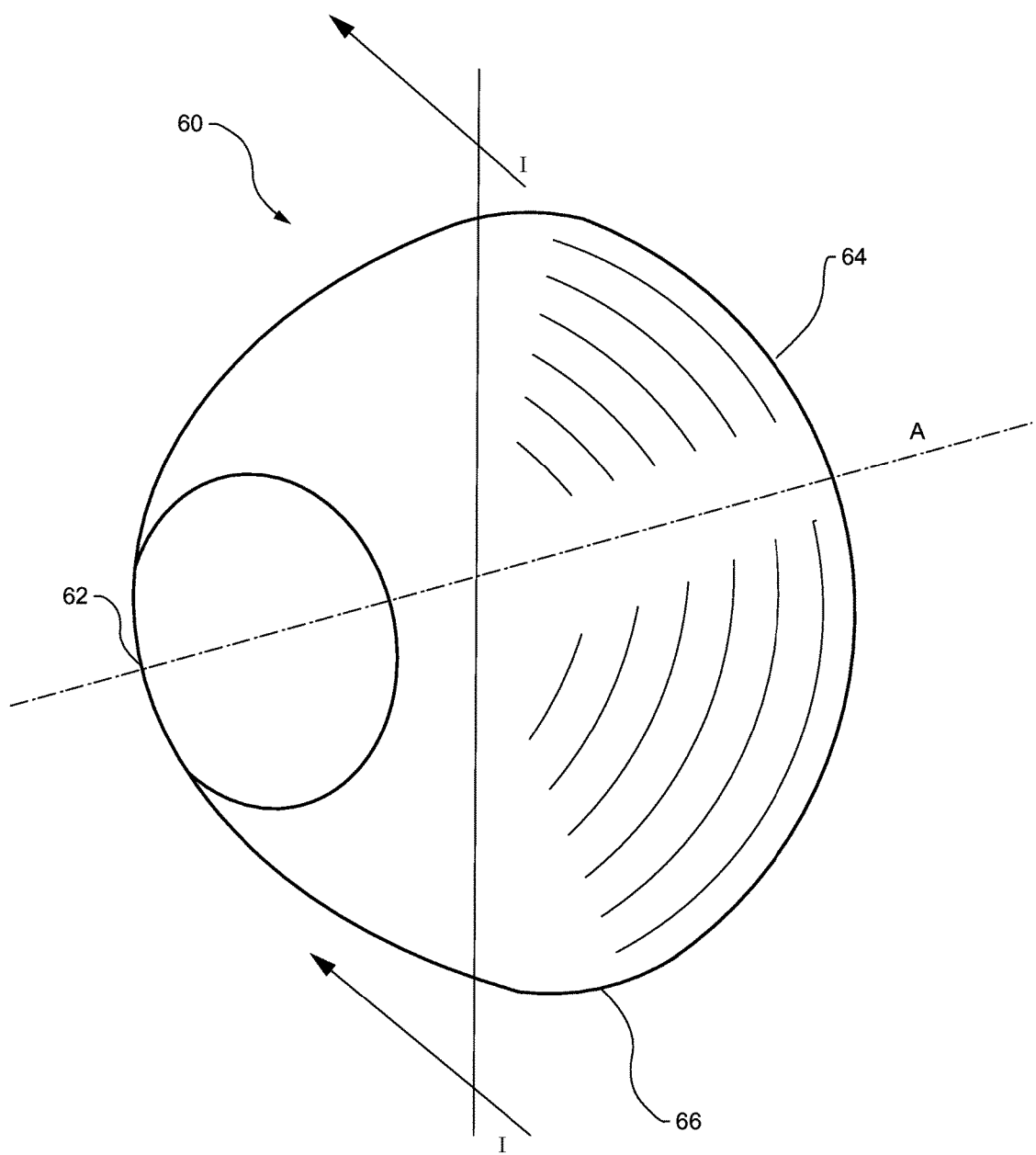
FIG. 3 is a perspective view of a spinner manufactured in accordance with the present disclosure.
Figure 4:
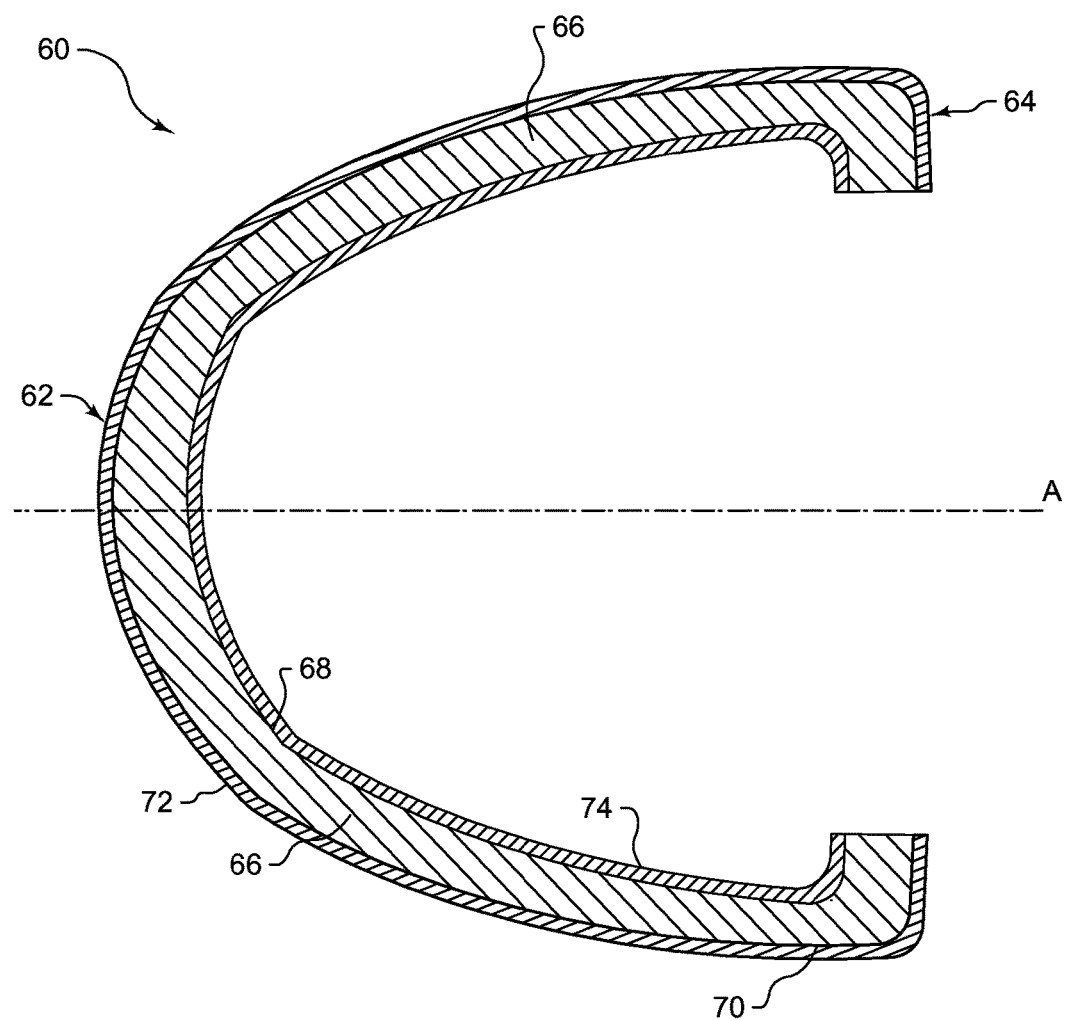
FIG. 4 is a cross-sectional view of a nosecone manufactured in accordance with the present disclosure in the direction of I-I of FIG. 3.

The spinner 60 may include a first end 62, a second end 64 and may have a body extending between the first and second ends as is shown in FIGS. 3 and 4. In addition, the body may have a generally conical shape.

Now with specific reference to FIG. 4, the body 66 of the spinner 60 may be comprised of a cured chopped unidirectional fiber pre-impregnated material.

Pre-impregnated material, or prepreg, is a combination of an uncured resin and fiber reinforcement network that is manufactured into a form that is ready for molding and curing into a composite part. Prepreg commonly comes in the form of ready to use mats or a free flowing flake material.

The fiber reinforcement network of prepreg customarily comes in the form multidirectional woven fabrics or a unidirectional material containing fibers that extend parallel to each other. In addition, the fibers may be chopped in short segments and randomly oriented in uncured resin to form a non-woven mat. These various fiber reinforcement network constructions are then impregnated with a controlled amount of a resin, and this material is then cut to form mats of ready to use prepreg.

Alternatively, the prepreg may be in the form of short segments of chopped unidirectional material that are randomly oriented with each other to form a non-woven mat of chopped unidirectional material. This type of prepreg is referred to as chopped unidirectional fiber pre-impregnated material. This material is similar to the more traditional non-woven fiber prepreg, except that short lengths of chopped unidirectional material (chips) are randomly oriented in the mat instead of randomly oriented chopped fibers. This random orientation of unidirectional chips leads to material properties that are same in any direction within the plane of the mat, and therefore chopped unidirectional fiber pre-impregnated material is termed transversely isotropic. Outside the plane of the mat, the material properties may be different.

The fiber of the chopped unidirectional fiber pre-impregnated material utilized to manufacture a spinner in accordance with the present disclosure may be graphite fiber, ceramic fiber, poly(p-phenylene-2,6-benzobisoxazole) fiber, mullite fiber, alumina fiber, silicon nitride fiber, silicon carbide fiber, boron fiber, boron nitride fiber, boron carbide fiber, glass fiber, titanium diboride fiber, yttria stabilized zirconium fiber, quartz fiber, glass fiber, graphite fiber or carbon fiber. In some instantiations, the fiber may be a combination of two or more of any of the foregoing list of fiber materials. The fiber, or fibers, utilized to manufacture a spinner in accordance with the present disclosure may depend on a combination of factors such as fiber cost and a particular fiber's resistance to inertial and thermally induced strain loading when combined with a particular resin or combination of resins.

The resin of the chopped unidirectional fiber pre-impregnated material utilized to manufacture a spinner in accordance with the present disclosure may be a thermoset resin or a thermoplastic resin. A thermoset resin is a polymer that irreversibly solidifies upon exposure to some trigger, and after such curing cannot be heated and melted to be shaped differently. Events that may trigger the curing of thermoset resin include exposure to heat above a certain temperature, by a chemical reaction or through exposure to particular types of irradiation. While the following list is not meant to be all inclusive, the thermoset resins of the chopped unidirectional fiber pre-impregnated material utilized to manufacture a spinner in accordance with the present disclosure may be polyester, thermoset urethane, cyanate ester, vinyl ester, polyimide, bisphenol A epoxy, bisphenol F epoxy, novolac epoxy, glycidyl epoxy, cycloaliphatic epoxy, glycidylamine epoxy, melamine, phenol formaldehyde, polyhexahydrotriazine and combinations thereof.

When utilizing a thermoset resin in a chopped unidirectional fiber pre-impregnated material to manufacture a spinner in accordance with the present disclosure, a mat of chopped unidirectional fiber pre-impregnated material may be placed into a mold cavity having the generally conical shape of the spinner. The mold may or may not be preheated. Then, the mold may be closed with a second preheated mold cavity having the generally conical shape of the spinner. Next, pressure may be applied in stages to move the material into the desired geometry. Finally, additional heat may be applied to the mold to cure the prepreg into the shape of the spinner.

In contrast to thermoset resin, a thermoplastic resin cures by solidification upon lowering its temperature past some point, such as the resin's thermal softening transition temperature, unique to each resin. In further contrast to thermoset resins, the thermoplastic resin will become pliable or moldable when heated above some temperature, such as the resin's thermal softening transition temperature, unique to each resin. Thus, unlike thermoset resins, thermoplastic resins do not irreversibly cure into a particular shape and may be molded into a different shape after the cooling process cures the thermoplastic resin. Some thermoplastic resins that may be utilized in chopped unidirectional fiber pre-impregnated material utilized to manufacture a spinner in accordance with the present disclosure include, but are not meant to be limited to, low density polyethylene, medium density polyethylene, high density polyethylene, ultra-high molecular weight polyethylene, polyvinyl chloride, polyethylene terephthalate, vinyl, polypropylene, poly(methyl methacrylate), nylon, polybenzimidazole, polystyrene, polytetrafluroethylene, polyetherimide, polyether ketone, polyether ether ketone, acrylonitrile butadiene styrene, styrene acrylonitrile, acrylonitrile styrene acrylate, polyamide, polyaryl ether ketone, polycarbonate, polyoxymethylene, polyphenylene ether, polyphenylene sulfide, polysulfone, polybutylene terephthalate, thermoset urethane and combinations thereof. In further contrast to thermoset materials, thermoplastic chopped unidirectional fiber pre-impregnated material may come in the form of a mat, or alternatively may come in the form of a free flowing flake material that flows freely at room temperature.

When utilizing a thermoplastic resin in a chopped unidirectional fiber pre-impregnated material to manufacture a spinner in accordance with the present disclosure, a mat or free flowing flakes may be placed into a mold cavity having the generally conical shape of the spinner. The mold may or may not be preheated. Then, the mold may be closed with a second preheated mold cavity having the generally conical shape of the spinner. Next, pressure may be applied in stages to help move the material to the desired geometry. Finally, heat may be removed from the mold to lower the temperature of the thermoplastic resin below its thermal softening transition temperature to cure the prepreg into the shape of a spinner.

As will be understood, the resin or resins, utilized to manufacture a spinner in accordance with the present disclosure may depend on a combination of factors such as resin cost and a particular fiber and resin combination's resistance to thermally induced strain loading. In addition, it is to be understood that that foregoing spinner 60 is only one exemplary embodiment. In other instances, specific regions of the spinner 60 may be selectively reinforced as required by increased thickness or via other techniques including but not limited to hat stiffeners and additional fiber reinforcement.

The foregoing however are not the only features of a spinner that may be manufactured in accordance with the present disclosure. While still referring to FIG. 4, the body 66 of the spinner 60 may further include an inner surface 68 and an outer surface 70. In addition, the outer surface 70 may be at least partially plated with a metal or a metal alloy first plating layer 72. Furthermore, the inner surface 68 may be at least partially plated with a metal or metal alloy second plating layer 74. In further instances, the inner and outer surfaces 68, 70 may be completely plated with a metal or metal alloy plating layers 72, 74.

While the following list is not meant to be exhaustive, the metal that may be utilized to form the plating layers 72, 74 on the inner and outer surfaces 68, 70 include aluminum, titanium and nickel. Some examples of metal alloys that may be utilized to form the plating layers 72, 74 on the inner and outer surfaces 68, 70 include aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®. As will be understood by a person designing a spinner, whether or not to use a metal or metal alloy plating layer may be dependent on a particular fiber and resin combination's resistance to thermally induced strain loading, and otherwise meet the additional requirements for spinners laid out in FAR § 33.

Figure 5:
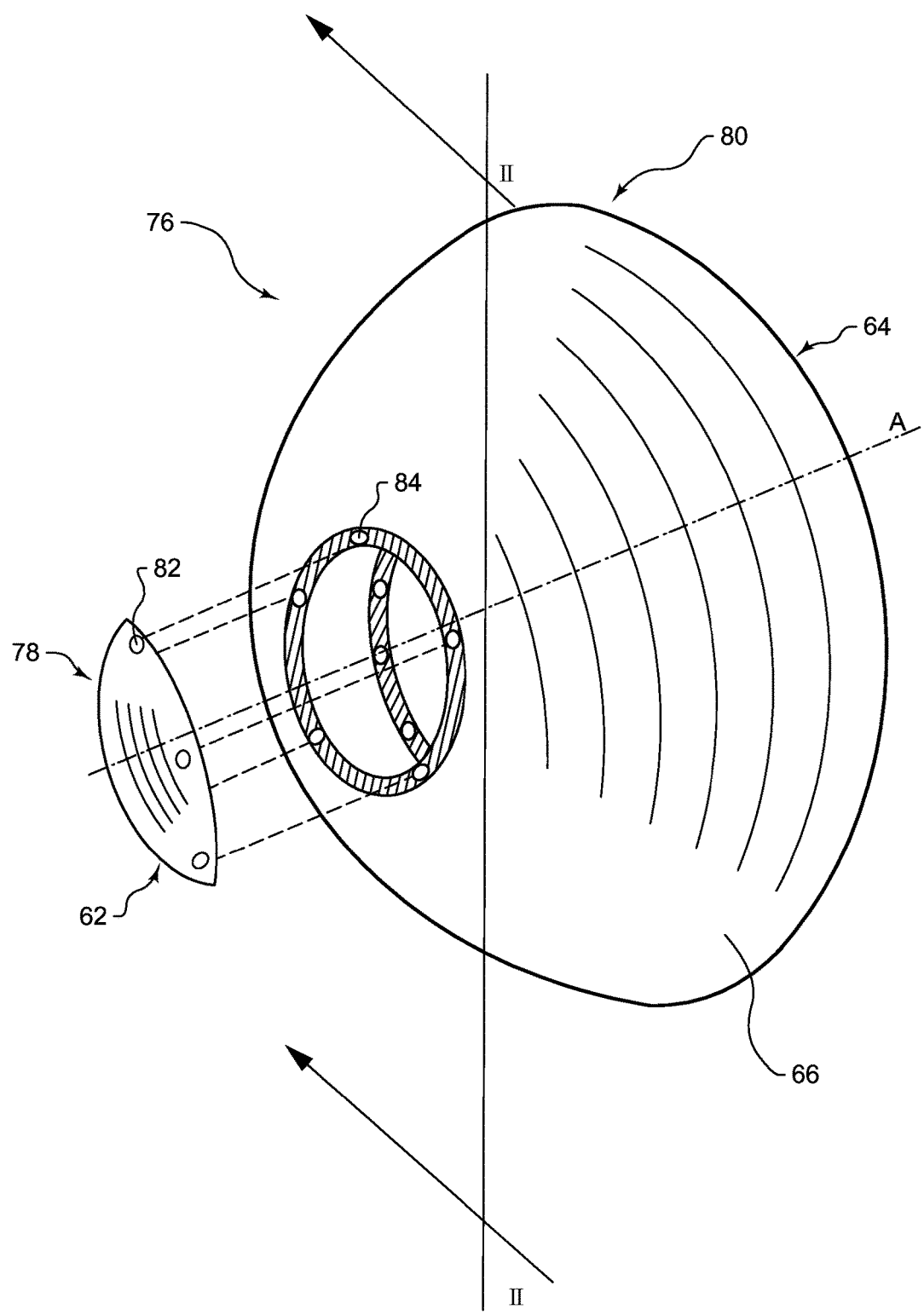
FIG. 5 is a perspective view of a second spinner manufactured in accordance with the present disclosure FIG. 6 a cross-sectional view of the second nosecone manufactured in accordance with the present disclosure in the direction of II-II of FIG. 5.
Figure 6:
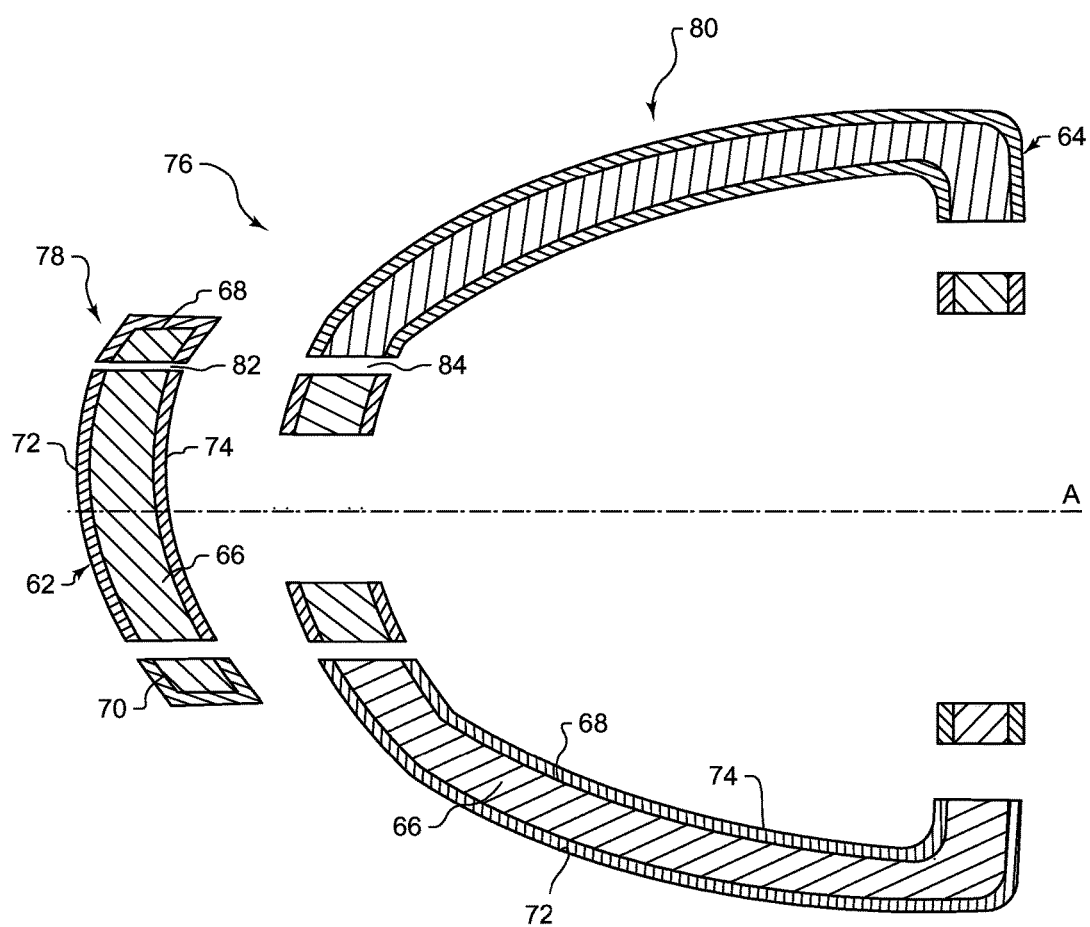

Now turning to FIGS. 5 and 6, it can be seen that a spinner 76 manufactured in accordance with present disclosure may also be created as two or more pieces. Like the one piece spinner 60 described above, a multiple piece spinner 76 may have a first end 62 and a second end 64, and a body 66 extending between the ends 62, 64. The body 66 may be comprised of a cured chopped unidirectional fiber pre-impregnated material. Furthermore, the fibers and resins used in the body 66 of the multiple piece spinner 76 may be the same as those described above for spinner 60.

Furthermore, the multiple piece spinner 76 may include an inner surface 68 and an outer surface 70. Analogous to the spinner 60 described above, the outer surface of 70 of spinner 76 may be at least partially plated with a metal or metal alloy to form a first plating layer 72, and the inner surface may be at least partially plated with metal or metal alloy to form a second plating layer 74. As will be understood, the metal or metal alloys utilized to create the first and second plating layers 72, 74 on the multiple piece spinner 76 are the same as those described above.

As will be noted, the primary difference between the spinner 60, and the multiple piece spinner 76, is the formation of a cap 78 and fairing 80, and then the joining of the cap and fairing to create a completed spinner 76 having a generally conical shape. As will further be noted, the cap 78 and fairing 80 may be fastened together by the use of mechanical fasteners placed through first apertures 82 and second apertures 84.

Figure 7:
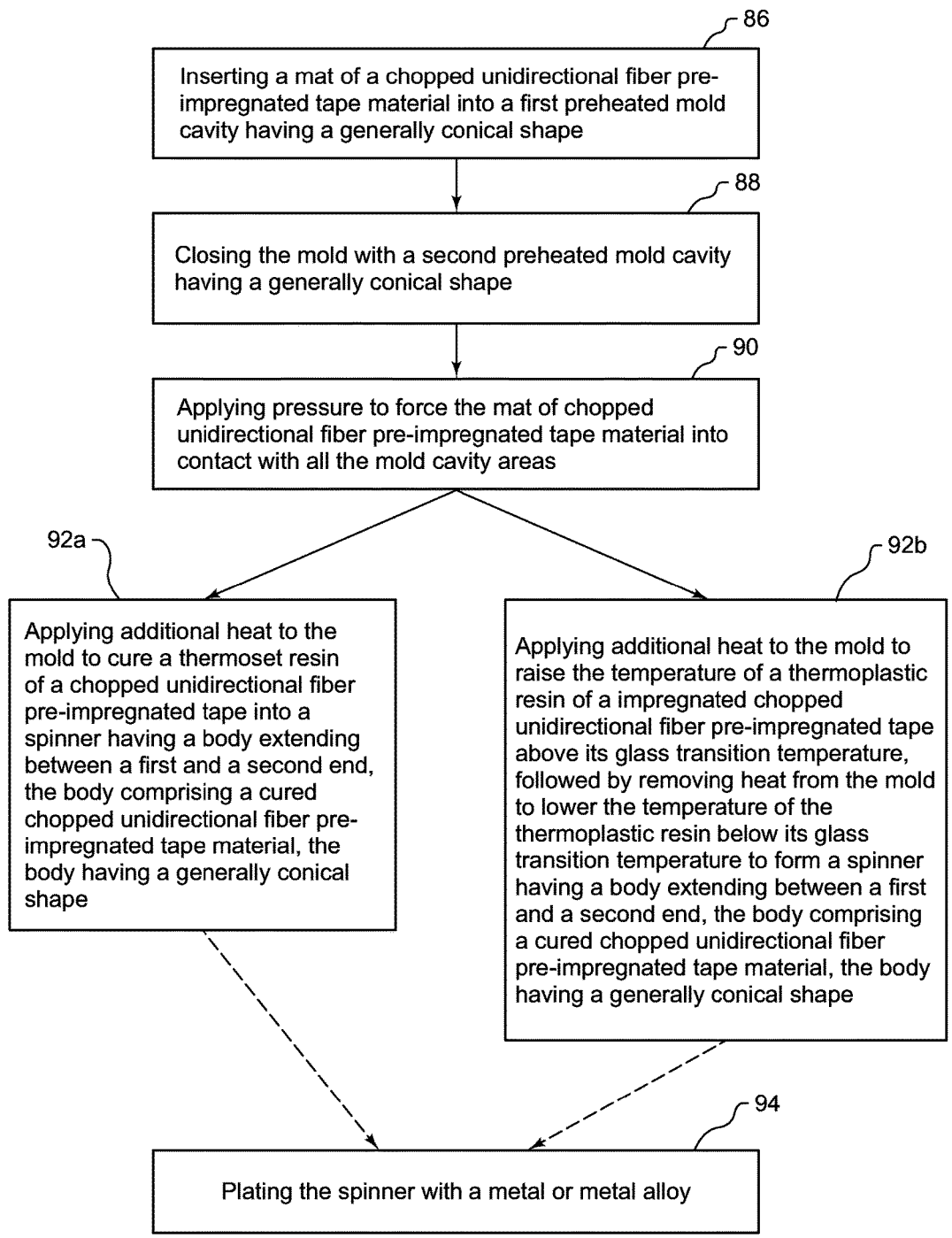
FIG. 7 is a flowchart depicting a sample sequence of steps which may be practiced in accordance with a method of manufacturing a nosecone of the present disclosure.

While the foregoing describes a gas turbine engine 20, and a spinner, the present disclosure also recites methods for manufacturing a spinner 60. An embodiment of these methods is depicted in the flowchart in FIG. 7. As is shown in this chart, the method may include the first step 86 of inserting a mat or free flowing flakes of a chopped unidirectional fiber pre-impregnated material into a first mold cavity having a generally conical shape. The mold cavity may or may not be preheated. As discussed above, this mat of chopped unidirectional fiber pre-impregnated material may include any one of the above-described fibers. Furthermore, this mat may also include any one of the above-mentioned thermoset or thermoplastic resins.

In a next step 88, the mold may be closed with a second preheated mold cavity having a generally conical shape. In contrast to the first mold cavity, which form the outer surface of the spinner, the second preheated mold cavity will form the inner surface of the spinner.

Then in step 90, pressure may be applied in stages to help move the material to the desired geometry. This step is undertaken to remove any air from the mold cavity, remove wrinkles from forming in the final product, and make sure that the chopped unidirectional fiber pre-impregnated material is evenly cured.

The next step in the process depends on whether the mat of chopped unidirectional fiber pre-impregnated material utilizes a thermoset or thermoplastic resin. If the mat uses a thermoset resin, then in next step 92a, additional heat may be applied to heat the mold to cure the thermoset resin of the chopped unidirectional fiber pre-impregnated material and form a spinner having a body extending between a first and second end, the body comprising cured chopped unidirectional fiber pre-impregnated material, the body having a generally conical shape.

If the mat uses thermoplastic resin, then in next step 92b, additional heat may be applied to the mold to raise the temperature of the thermoplastic resin of the chopped unidirectional fiber pre-impregnated material above its thermal softening transition temperature, followed by removing heat from the mold to lower the temperature of the thermoplastic resin below its thermal softening transition temperature to form a spinner having a body extending between first and second ends, the body comprising a cured chopped unidirectional fiber pre-impregnated material, the body having a generally conical shape.

Finally, in a last optional step 94, the completed spinner formed from either step 92a or 92b may be plated with a metal or metal alloy. As described above, the inner surface, the outer surface or both may be plated with a metal. Additionally, the metal or metal alloy utilized to plate the spinner may be any one of those described above.

INDUSTRIAL APPLICABILITY

In operation, the spinner can find use in many industrial settings, including but not limited to, gas turbine engines for use in aircraft. More specifically, various spinners having a body extending between a first end and a second end, the body being comprised of cured chopped unidirectional fiber pre-impregnated material, and the body having a generally conical shape are disclosed. The fiber portion of the cured chopped unidirectional fiber pre-impregnated material may be selected from carbon-fiber, graphite-fiber, ceramic, poly (p-phenylene-2,6-benzobisoxazole), mullite, alumina, silicon nitride, silicon carbide, boron, boron nitride, boron carbide, glass, quartz, titanium diboride, yttria stabilized zirconium and combinations thereof. The resin portion of the cured chopped unidirectional fiber pre-impregnated material may be a thermoset resin or a thermoplastic resin. The thermoset resin may be selected from the group consisting of polyester, thermoset urethane, cyanate ester, vinyl ester, polyimide, bisphenol A epoxy, bisphenol F epoxy, novolac epoxy, glycidyl epoxy, cycloaliphatic epoxy, glycidylamine epoxy, melamine, phenol formaldehyde, polyhexahydrotriazine and combinations thereof. The thermoplastic resin may be selected from the group consisting of low density polyethylene, medium density polyethylene, high density polyethylene, ultra-high molecular weight polyethylene, polyvinyl chloride, polyethylene terephthalate, vinyl, polypropylene, poly(methyl methacrylate), nylon, polybenzimidazole, polystyrene, polytetrafluroethylene, polyetherimide, polyether ketone, polyether ether ketone, acrylonitrile butadiene styrene, styrene acrylonitrile, acrylonitrile styrene acrylate, polyamide, polyaryl ether ketone, polycarbonate, polyoxymethylene, polyphenylene ether, polyphenylene sulfide, polysulfone, polybutylene terephthalate, thermoset urethane and combinations thereof.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A spinner for a gas turbine engine, comprising:
   a body having a first end and a second end,
   the body being a multi-piece body having a fairing at the first end, a cap at the second end, wherein the fairing and the cap are fastened intermediate the first end and the second end,
   the body having a conical shape wherein each of the fairing and the cap;
   is formed from a nonwoven mat of short segments of chopped unidirectional fiber pre-impregnated material randomly oriented with respect to each other such that the mat is transversely isotropic, and
   has a plurality of surfaces including an inner surface and an outer surface,
   the plurality of surfaces being plated with a metal or a metal alloy plating layer.

2. The spinner according to claim 1, wherein fiber of the chopped unidirectional fiber pre-impregnated material is selected from the group consisting of carbon-fiber, graphite-fiber, poly(p-phenylene-2,6-benzobisoxazole), mullite, alumina, silicon nitride, silicon carbide, boron, boron nitride, boron carbide, glass, quartz, titanium diboride, yttria stabilized zirconium and combinations thereof.

3. The spinner according to claim 1, wherein resin of the chopped unidirectional fiber pre-impregnated material is a thermoset resin.

4. The spinner according to claim 3, wherein the thermoset resin is selected from the group consisting of polyester, thermoset urethane, cyanate ester, vinyl ester, polyimide, bisphenol A epoxy, bisphenol F epoxy, novolac epoxy, glycidyl epoxy, cycloaliphatic epoxy, glycidylamine epoxy, melamine, phenol formaldehyde, polyhexahydrotriazine and combinations thereof.

5. The spinner according to claim 1, wherein resin of the chopped unidirectional fiber pre-impregnated material is a thermoplastic resin.

6. The spinner according to claim 5, wherein the thermoplastic resin is selected from the group consisting of low density polyethylene, medium density polyethylene, high density polyethylene, ultra-high molecular weight polyethylene, polyvinyl chloride, polyethylene terephthalate, vinyl, polypropylene, poly(methyl methacrylate), nylon, polybenzimidazole, polystyrene, polytetrafluroethylene, polyetherimide, polyether ketone, polyether ether ketone, acrylonitrile butadiene styrene, styrene acrylonitrile, acrylonitrile styrene acrylate, polyamide, polyaryl etherketone, polycarbonate, polyoxymethylene, polyphenylene ether, polyphenylene sulfide, polysulfone, polybutylene terephthalate, thermoset urethane and combinations thereof.

7. The spinner according to claim 1, wherein the metal or the metal alloy plating layer on the inner surface is metal selected from the group consisting of aluminum, titanium, nickel and combinations thereof.

8. The spinner according to claim 1, wherein the metal or the metal alloy plating layer on the outer surface is selected from the group consisting of aluminum alloys, steel, nickel alloys, titanium alloys and combinations thereof.

9. A gas turbine engine, comprising:
a compressor section;
a combustor section downstream of the compressor section; and
a fan section upstream of the compressor section, the fan section including a spinner, the spinner including:
a body extending between a first end and a second end, the body having a conical shape formed from a nonwoven mat of short segments of chopped unidirectional fiber pre-impregnated material randomly oriented with respect to each other such that the mat is transversely isotropic, and
the body having a plurality of surfaces including an inner surface and an outer surface,
the plurality of surfaces being plated with a metal or a metal alloy plating layer.

10. The gas turbine engine of claim 9, wherein fiber of the chopped unidirectional fiber pre-impregnated material is selected from the group consisting of carbon-fiber, graphite-fiber, poly(p-phenylene-2,6-benzobisoxazole), mullite, alumina, silicon nitride, silicon carbide, boron, boron nitride, boron carbide, glass, quartz, titanium diboride, yttria stabilized zirconium and combinations thereof.

11. The gas turbine engine according to claim 9, wherein resin of the chopped unidirectional fiber pre-impregnated material is a thermoset resin.

12. The gas turbine engine according to claim 11, wherein the thermoset resin is selected from the group consisting of polyester, thermoset urethane, cyanate ester, vinyl ester, polyimide, bisphenol A epoxy, bisphenol F epoxy, novolac epoxy, glycidyl epoxy, cycloaliphatic epoxy, glycidylamine epoxy, melamine, phenol formaldehyde, polyhexahydrotriazine and combinations thereof.

13. The gas turbine engine according to claim 9, wherein resin of the chopped unidirectional fiber pre-impregnated material is a thermoplastic resin.

14. The gas turbine engine of claim 13, wherein the thermoplastic resin is selected from the group consisting of low density polyethylene, medium density polyethylene, high density polyethylene, ultra-high molecular weight polyethylene, polyvinyl chloride, polyethylene terephthalate, vinyl, polypropylene, poly(methyl methacrylate), nylon, polybenzimidazole, polystyrene, polytetrafluroethylene, polyetherimide, polyether ketone, polyether ether ketone, acrylonitrile butadiene styrene, styrene acrylonitrile, acrylonitrile styrene acrylate, polyamide, polyaryl ether ketone, polycarbonate, polyoxymethylene, polyphenylene ether, polyphenylene sulfide, polysulfone, polybutylene terephthalate, thermoset urethane and combinations thereof.

15. The gas turbine engine of claim 9, wherein the metal or the metal alloy plating layer on the inner surface is metal selected from the group consisting of aluminum, titanium, nickel and combinations thereof.

16. The gas turbine engine of claim 9, wherein the metal or the metal alloy plating layer on the outer surface is selected from the group consisting of aluminum alloys, steel, nickel alloys, titanium alloys and combinations thereof.

17. A method for manufacturing a spinner for a gas turbine engine from chopped unidirectional fiber pre-impregnated material;
the spinner comprising:
a body having a first end and a second end,
the body being a multi-piece body having a fairing at the first end, a cap at the second end, wherein the fairing and the cap are fastened intermediate the first end and the second end,
the body having a conical shape wherein each of the fairing and the cap;
is formed from a nonwoven mat of short segments of chopped unidirectional fiber pre-impregnated material randomly oriented with respect to each other such that the mat is transversely isotropic, and
has a plurality of surfaces including an inner surface and an outer surface,
the plurality of surfaces being plated with a metal or a metal alloy plating layer, the method comprising the steps:
inserting the nonwoven mat of short segments of chopped unidirectional fiber pre-impregnated material into a first mold cavity having a generally conical shape;
closing the first mold with a second preheated mold cavity having generally conical shape; and
applying pressure to force the nonwoven mat of short segments of chopped unidirectional fiber pre-impregnated material into contact with a mold cavity area.

18. The method according to claim 17, further including the step of applying heat to the first or second mold to cure a thermoset resin of the nonwoven mat of short segments of chopped unidirectional fiber pre-impregnated material.

19. The method according to claim 17, further including the step of applying heat to the mold to raise the temperature of a thermoplastic resin of the nonwoven mat of short segments of chopped unidirectional fiber pre-impregnated material above the thermoplastic resin's thermal softening transition temperature, followed by removing heat from the mold to lower the temperature of the thermoplastic resin below the thermoplastic resin's thermal softening transition temperature.

* * * * *